| (12) | United States Patent<br>Boyd et al. | | (10) Patent No.: US 7,742,422 B2<br>(45) Date of Patent: Jun. 22, 2010 |

| (54) | DISTRIBUTED MESSAGE ROUTING IN A VIRTUALIZED MESSAGING SYSTEM USING RECURSIVE LEAST SQUARES LINKS COST ESTIMATION WITH CHOKE POINTS |
|---|---|
| (75) | Inventors: Erin Ann Boyd, Three Forks, MT (US); Stewart Jason Hyman, Richmond Hill, CA (US); James T. Smith, II, Boulder, CO (US); Stephen James Watt, Cedar Park, TX (US) |
| (73) | Assignee: International Business Machines Corporation, Armonk, NY (US) |
| ( * ) | Notice: Subject to any disclaimer, the term of this patent is extended or adjusted under 35 U.S.C. 154(b) by 519 days. |
| (21) | Appl. No.: 11/567,914 |
| (22) | Filed: Dec. 7, 2006 |
| (65) | Prior Publication Data<br>US 2008/0137546 A1   Jun. 12, 2008 |
| (51) | Int. Cl.<br>*H04J 1/16* (2006.01) |
| (52) | U.S. Cl. .................................. 370/237 |
| (58) | Field of Classification Search .......... 370/238, 370/241, 252, 229–235, 238.1, 237; 709/230, 709/232, 235, 238, 241<br>See application file for complete search history. |

(56) References Cited

U.S. PATENT DOCUMENTS

| 6,347,091 B1 * | 2/2002 | Wallentin et al. ........... 370/437 |
| 7,031,309 B1 * | 4/2006 | Sautter et al. .............. 370/392 |
| 2001/0025310 A1 * | 9/2001 | Krishnamurthy et al. .... 709/223 |
| 2003/0105800 A1 | 6/2003 | Cullen ..................... 709/201 |
| 2004/0114569 A1 * | 6/2004 | Naden et al. .............. 370/351 |
| 2004/0139375 A1 * | 7/2004 | Benesty .................. 714/700 |
| 2005/0021622 A1 | 1/2005 | Cullen ..................... 709/204 |
| 2006/0227706 A1 * | 10/2006 | Burst, Jr. .................. 370/229 |

FOREIGN PATENT DOCUMENTS

| WO | 0246949 A1 | 6/2002 |
| WO | WO 2005/036795 | 4/2005 |

OTHER PUBLICATIONS

Brscic D et al, "ATM Available Bit Rate Congestion Control with On-line Network Model Identification", Electronics, Circuits and Systems, 2002, 9th International Conference on Sep. 15-18, 2002, Piscataway, NJ, USA, IEEE, vol. 3, Sep. 15, 2008, pp. 1243-1246, XP010614581, ISBN: 0-780-7596-3.

Chansarkar M M et al., "Robust Recursive Least Squares Algorithm", Statistical Signal and Array Processing, Minneapolis, Apr. 27-30, 1993, Proceedings of the International Conference on Acoustics, Speech, Signal Processing (ICASSP), New York, IEEE, US, vol. 4, Apr. 27, 1993, pp. 432-435, XP010110668, ISBN:0-7803-0946-4.

PCT Notification of Transmittal of the International Search Report and the Written Opinion of the International Searching Authority, or the Declaration dated Mar. 18, 2008.

* cited by examiner

*Primary Examiner*—Kwang B Yao
*Assistant Examiner*—Obaidul Huq
(74) *Attorney, Agent, or Firm*—Arthur Samodovitz; Law Offices of Jim Boice

(57) ABSTRACT

Routing data packet traffic in packet networks, expediting the flow of the data packets and reducing the effects of congestion at nodes is accomplished by capturing latency data for nodes for initial measurement times; and computing a least squares estimate of the delay as a recursive least-squares solution.

8 Claims, 2 Drawing Sheets

DISTRIBUTED MESSAGE ROUTING IN A VIRTUALIZED MESSAGING SYSTEM USING RECURSIVE LEAST SQUARES LINKS COST ESTIMATION WITH CHOKE POINTS

BACKGROUND

1. Field of the Invention

The invention relates to methods, systems, and computer program products for transferring data among a plurality of spatially distributed computers or digital data processing systems via one or more communications media, such as computer networks. Specifically, the invention relates to routing data packet traffic in such networks and expediting the flow of the data packets and reducing the effects of congestion at nodes.

2. Background Art

Data is communicated with data services, data storage, and data users as data packets between nodes through networks under the control of routers.

As used herein a packet is the unit of data that is routed between an origin and a destination on the Internet or any other packet switched network. When any file (e-mail message, file, HTML file, GIF file URL request, and so forth) is routed from one place to another within a message oriented middleware system (MOM) the file is divided into "chunks" or packets of an efficient size for routing. Each of these packets is separately numbered and includes the Internet address of the destination. The individual packets for a given file may travel different routes through the Internet. When they have all arrived, they are reassembled into the original file (by the TCP layer at the receiving end). In this context packet-switching is an efficient way to handle transmissions on a connectionless network such as the Internet.

As used herein a "router" means a device or, in some cases, software in a computer, that determines the next network point to which a packet should be forwarded on its way to its destination. The router is connected to at least two networks and decides which way to send each information packet based on the router's current understanding of the state of the networks it is connected. A router is located at any gateway (where one network meets another), including each gateway on the Internet. A router is often included as part of a network.

A router may create or maintain a table of the available routes and their conditions and use this information along with distance and cost algorithms to determine the best route for a given packet. Typically, a packet may travel through a number of network points with routers before arriving at its destination. Routing is a function associated with the standard model of network programming, the Open Systems Interconnection model.

One application of networks between nodes under the control of routers is Message Oriented Middleware. As used herein, message-oriented middleware (MOM) refers to a kind of asynchronous messaging system where multiple applications communicate via a shared message bus, that is, an asynchronous messaging system interconnects the applications. Application Programming Interfaces (APIs) that extend across diverse platforms and networks are typically provided by the MOM.

In client-server applications, message-oriented middleware provides support for asynchronous communication between client and server applications. Message queues provide temporary storage when the destination program is busy or not connected. Implementing message-oriented middleware within a client server application, decouples the client application from the server application.

An extension to MOM known as the Enterprise Service Bus (ESB) provides a messaging infrastructure for Service Oriented Architectures. Virtualizing the ESB enables an infrastructure that is reliable, low cost, and easily scalable. In this context, an ESB can be virtualized through the deployment of a collection of full function nodes. Each individual node is capable of delivering the entire ESB, but with limited bandwidth for processing messages. Each node that is added to the virtualized ESB increases the message processing bandwidth of the ESB. This work is applicable to virtualized ESB deployments with both homogeneous and heterogeneous nodes, e.g., nodes may or may not be capable of delivering the same level of message throughput.

Producers of messages within a virtualized ESB must select a node to process outgoing messages. That is, producers must select the "best" node for routing their messages. The best node for processing a message is defined as one that provides the minimum message latency. The general problem then becomes how to implement a message routing heuristic that minimizes message latency without compromising reliability or scalability.

A common technique for routing packets on a network is through shortest path first (SPF). Shortest Path First is a common technique in network packet routing, where the packet is sent along the shortest path from the current router to its destination. This technique alone is well known to have performance issues.

Network packet routing is a kind of distributed system where each router sees a delayed view of the current state of the network. When each router utilizes a SPF approach then a race condition can occur when the network is under high load. Essentially when a single link becomes under-utilized, all routers race to use that link, since it is under-utilized and offers the shortest path. The result is that the under-utilized link quickly becomes overwhelmed causing network traffic to be routed away from that link and an oscillation occurs that degrades network performance.

In the SPF algorithm, a router estimates the path length from the router to the packet's destination through each of its output ports, and sends the packet through the port that offers the shortest path to the packet's destination. As described herein, an analogous construct is used to estimate the delay associated with routing a message from the message producer to its destination through any of the nodes adjacent to the producer.

Delay and congestion can be modeled using "choke packets." Choke packets, as they are used in networking, are a mechanism for congestion control that limits message transfers. In the context of networking, when traffic through a switch passes a predefined threshold then the switch transmits a choke packet to the source of the current traffic informing the source to reduce traffic volumes by a given percentage. In a virtualized ESB, choke packets are used to communicate transmission delays to the message producer to enable the sender to select a more effective channel for transmission of their message. Choke packets are used to redirect the transmission of messages away from highly loaded nodes to more effective nodes.

SUMMARY OF THE INVENTION

We avoid problems of the prior art by providing a distributed scheduling procedure for minimizing round trip message latency through a network of servers in a virtualized Message-Oriented Middleware (MOM) system, using a recursive least-squares prediction model for estimating the message latency in a virtualized MOM environment. Further, we utilize choke packets in the messaging layer to provide congestion control to the virtualized MOM environment that is directly compatible with the basic message latency estimation technique. This estimation procedure is then used by the distributed message routers to select nodes in the MOM on a per message basis that will minimize message latency without introducing a single point of failure to the virtualized MOM. This solution provides a more efficient and scalable means of effectively implementing a virtualized message bus.

Specifically, the problems associated with node congestion are avoided by routing message packets from one node in a network to another node by using message latency predictions to guide future message transfers and augmenting the predictions with direct node feedback in the form of choke packets used to correct anomalous behavior within the network. According to our invention the latency through a node for a subsequent packet is predicted using a well known recursive least squares procedure. The recursive least squares procedure attempts to fit a linear model to past message latency measurements to predict future message latencies for a next packet through each of the attached nodes.

The recursive least squares procedure produces an initial latency estimate from previously measured latency data. The initial estimate is updated, or corrected, by applying a correction term to the previous estimate that is constructed from more recently measured message latencies.

The method of the invention utilizes a collection of past data points, i.e., message latencies—where latency is bound to the current load on a node in the system—to predict future message latencies. This is inherently time dependent and subject to change, therefore, a recursive least squares approach is justified as it regularly corrects the latency estimate by applying new measurements to the estimation process. Further, the invention incorporates node feedback—transmitted in the form of choke packets—into the recursive least squares estimation process. That is, when a choke packet is received from a node the implied processing delay incorporated within the choke packet is used to re-execute the recursive least squares procedure to produce a new latency measurement for future messages through that node.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
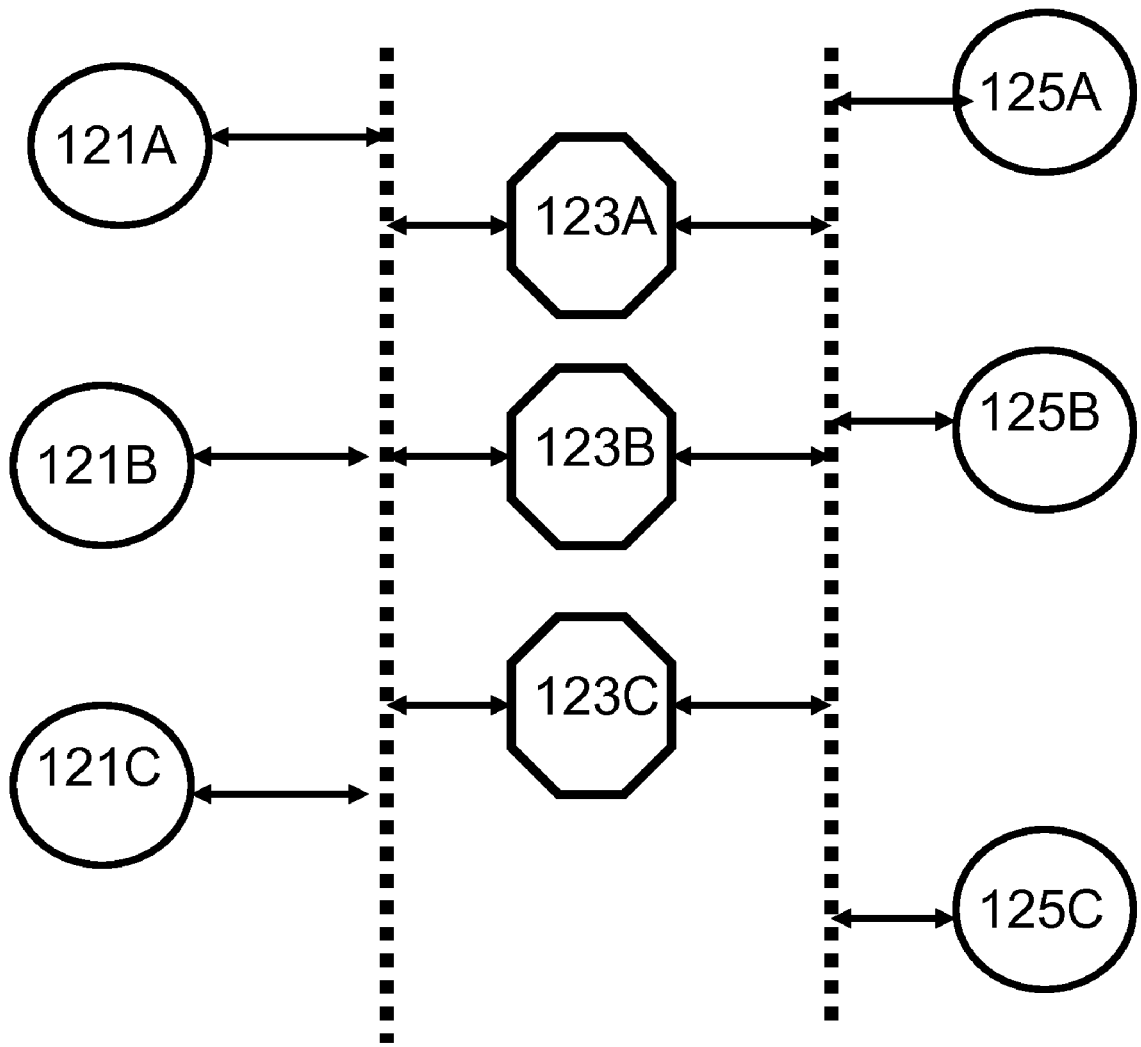
FIG. 1 is a high level schematic diagram of a packet network with a router and nodes.

The invention described herein controls routing of message packets from one node, e.g., a requester node, in a network to another node, e.g., a provider node in the network, through the network from the requester node, i.e., the origin node to a provider node, i.e., the destination node using a chosen path through the network. FIG. 1 is a high level schematic diagram of a packet network 101 with nodes, including requester nodes 121A, 121B, and 121C associated with Routing Agent Software, and provider nodes 125A, 125B, and 125C, and ESB nodes as intermediate nodes 123A, 123B, and 123C. The requester nodes 121A, 121B, and 121C, the ESB intermediate nodes 123A, 123B, and 123C, and the provider nodes, 125A, 125B, and 125C are all characterized by the presence of processors, memory, and communications interfaces for data and control.

Consider the system represented in FIG. 1, above. A requester, as requester 121A, 121B, or 121C, requests an ESB node to send a packet to a provider node, as provider node 125A, 125B, or 125C. The packets are associated in a queue (or queues).

Routing from Requester Nodes, as 121A, 121B, or 121C to ESB Nodes, as nodes 123A, 123B, or 123C to Provider Nodes, as nodes 125A, 125B, or 125C, is accomplished by a Routing Agent associated with a requester (as a software application). The Routing Agent software application scans the ESB Nodes, 123A, 123B, or 123C, and sends the packet to the ESB Node 123A, 123B, or 123C, with the lowest latency.

Latency is determined by analysis of time stamp data. Specifically, the ESB nodes, 123A, 123B, and 123C, duplex receipt of a packet by sending an acknowledgement back to the requester. The time delay for the round trip is a measure of the latency at the ESB node, 123A, 123B, or 123C.

This round trip measure of latency is measured against a threshold. The threshold is neither static nor arbitrary, but is dynamic and a function of round trip time delay history. The measure is dynamic because even if the latency is apparently a large number, the particular node may be part of a best path through a network.

The acknowledgement time delays are operated on by a recursive least squares procedure, processing a sequence of previous acknowledgement round trip delays to determine predicted future delays.

The best path through the network is obtained by predicting latency through a node, e.g., ESB Node 123A, 123B, or 123C, for a subsequent packet. However, a Routing Agent's view of the network is inherently delayed, i.e., when a Routing Agent must decide on a route for a message it is doing so without complete knowledge of network traffic. Thus, it is possible for the predicted latency through a node to deviate from the actual latency through a node. Consequently, a mechanism is required to correct the differences in actual system performance and expected near term future performance. The chosen mechanism within this invention is to communicate to Routing Agents an aggregate expected delay based on the node's current backlog of messages. This aggregate is referred to as a choke packet and provides an latency estimate of the node's current messaging backlog. The latency estimate provided by the choke packet is incorporated into future latency predictions for that node. According to our invention the recursive least squares algorithm identifies past latency measurements as a function of time, extrapolates from past message latencies to generate a predicted future latency for a next packet.

Figure 2:
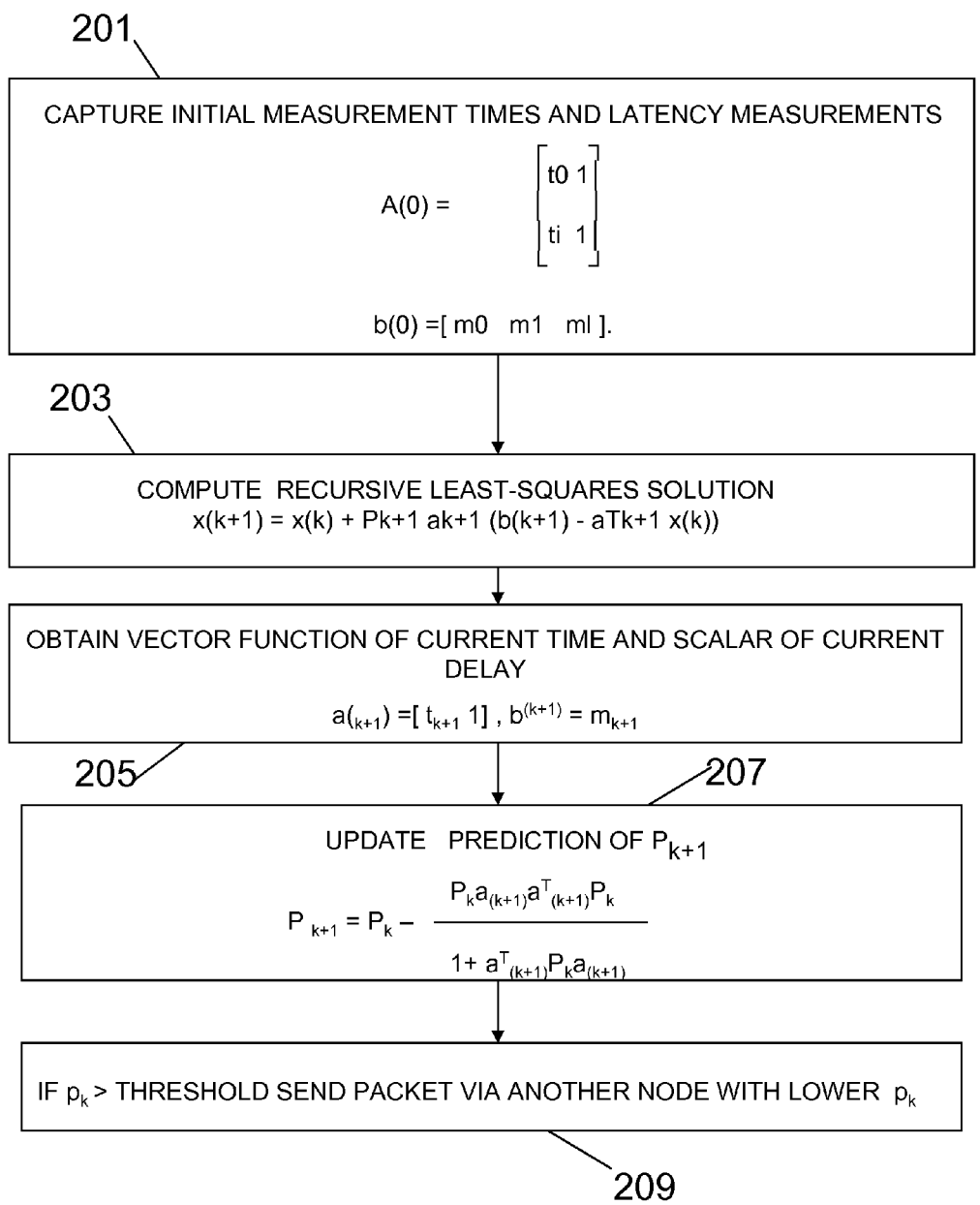
FIG. 2 represents a high level flow chart of a method of the invention.

FIG. 2 represents a high level flow chart of a method of the invention. As shown in the figure, the process begins by capturing data for each node for initial measurement times $t_0, \ldots, t_1$, and initial message latency measurements $m_0, \ldots, m_1$, 201, and computing a least squares estimate of the solution, i.e., the delay 203 as a recursive least-squares solution, $$x^{(k+1)} = x^{(k)} + p_{k+1} a_{k+1} (b^{(k+1)} - a^t_{k+1} x_{(k)}).$$

In the equation, the x-axis corresponds to the time that the measurements were taken, and the y-axis corresponds to the actual message latency. This latency prediction is updated for each completed message transfer with the vector $$a_{(k+1)} = [t_{k+1} 1]$$

where $t_{k+1}$ is the time the latency measure was received and $b^{(k+1)}$ is the actual message latency. If the acknowledgement contains a choke packet, then the value of $b^{(k+1)}$ will be equal to the delay expressed in the choke packet.

These terms update the latency prediction where updates are expressed as a combination of a two dimensional vector representing time, $a_{(k+1)} = [t_{k+1} 1]$, and a scalar representing delay, $b^{(k+1)} = m_{k+1}$. We let $p_0 = (a_0{}^t a_0)^{-1}$, therefore $x^{(0)} = p_0 a^t{}_0 b_{(0)}$. Thus, the equation for updating $p_{k+1}$ given $a_{(k+1)}$, a vector, and $b^{(k+1)}$, a scalar, is given by 207

$$p_{k+1} = p_k - \frac{p_k a_{(k+1)} a(_{k+1}^t) p_k}{1 + a_{(k+1)}^t p_k a_{(k+1)}}$$

To obtain a current, real time, prediction of delay through a node that is compared to a threshold to determine if subsequent packets should be rerouted to avoid congestion 209.

If in response to a request for processing the Routing Agent receives a choke packet, the agent updates the link cost estimate for that node with the delay expressed in the choke packet and finds the new minimum link cost estimate node. If no other node can process the request sooner given the delay expressed in the choke packet, then the message is routed through the original node after the delay period expressed in the choke packet.

The deployment of a MOM provider as a global enterprise service, or even as a smaller, more localized service, precludes the use of a centralized routing scheme for messages sent through the service. Therefore, a virtualization mechanism must be introduced that enables the MOM provider to be globally deployed as a collection of distributed "nodes" acting together as a single service. Each node in the MOM service is functionally capable of transferring all messages, e.g., each node is a replica of the entire service. In this virtualized definition of a globally deployed MOM provider, individual nodes are interconnected into a network that provides the capability for any message source to communicate with any message destination via any node on the network. Senders and receivers connect to MOM nodes through a Routing Agent. In this system, all individual communications are assumed to be encapsulated in a single message. Also, message responses may be transported on any route through the MOM infrastructure, e.g., responses may be treated as independent messages from the requests that caused their transmission.

The performance of MOM for each request is measured according to message latency. Message latency is defined as the time difference between the time of the initial transmission of a message from the input of a Routing Agent to the time that an acknowledgement of the message is received at the Routing Agent. Each Routing Agent is capable of sending messages through any one of the N nodes in the network—in this system it is assumed that all nodes are capable of reaching all destinations.

Nodes are assumed to be geographically dispersed around the network or the internet of connected networks to meet the needs of a global community. Consequently, the communication time from any source to any destination will potentially differ depending on the node that is selected to process the message. Further, individual nodes in the network are heterogeneous, e.g., each node may have a different throughput capacity for routing messages.

In this system, a hierarchy of functionality is established to differentiate between the components that comprise the system. Senders and receivers communicate with MOM nodes through Routing Agents that insulate them from explicit knowledge of the nodes on the network. Routing Agents provide the platform for deploying the distributed scheduling heuristic described herein.

Sources and destinations are assumed to be capable of connecting to any node in the system. Each node is capable of connecting to all sources and destinations, either directly or through communication with other nodes. Sources and destinations on the network only have knowledge of their assigned Routing Agents. In this system, receivers of messages register a need for the receipt of a specific type of message with the message Routing Agents—possibly by describing the message contents. When a Routing Agent receives a message from a source, the agent must transfer that message to a node for processing. The node checks all recipients that have registered a need for that type of message and ensures that the message is transferred to the recipient.

In one embodiment, each message transfer requires an acknowledgement. If a node sends a message to multiple destinations, then the sender will receive a successful response only after a successful response has been received from all destinations of the message. Erroneous message transfers are handled on a per client basis. A Routing Agent attempting to send a message on behalf of a source may send the message through any one of the N nodes in the network. To select a specific node to send a message requires that the Routing Agent have a means for differentiating between the levels of service that can be offered by the available nodes in the system.

Each Routing Agent is assumed to greedily transfer its messages at the highest rate achievable on the network, e.g., the optimization goal of the network is to minimize message latency for each message. Message latency is the difference between the arrival time of the sender's message at some message router in the network and the arrival time of a response to that message at the original sender. This measurement has some inherent noise that is unrelated to the performance of a particular node. That is, if some message destination is overloaded and delays the response, then the message latency may be artificially high, though no other message router could have improved the message latency.

In an actual network, multiple Routing Agents transfer messages through multiple nodes simultaneously. Therefore, it is not possible for a Routing Agent to know the exact load on any given node at any point in time. The Routing Agent must instead rely on the latest information received from a node to estimate the cost of transmitting its message through that node. A subset of the most recent message latency measurements is retained at the Routing Agent for each node that the agent transmits messages through. This set of measurements is then used to estimate near term future message latency provided by that node.

In the network described herein, the estimated message latency for a message sent through a node serves as an estimate of a link cost associated with transferring a message through that node. As described herein, we develop a link cost estimation approach based on the application of recursive least squares fitting where past link costs are used to generate near-term future link cost estimates.

FIG. 2 is a flow chart showing the execution of one such procedure.

To accommodate the impact on noisy measurements of message latency an additional mechanism is introduced to enable nodes to inform senders that load has unexpectedly increased. To inform the senders of the increased load, Routing Agents will send a "choke packet" to the Routing Agent informing the agent to hold all transmissions through that node for some amount of time specified in the choke packet. This allows the load on the node to fall. The use of choke packets results in an effective decrease in the link cost of all links that pass through the node that sent the choke packet.

Estimating future link costs from any single node to a given destination in the MOM is required for the distributed message routing technique of our invention. Link costs in this model are equated with message latency, as defined earlier. In one embodiment, each transmitted message is acknowledged by the recipient. Therefore, message latency can be viewed as the time between a message transmission from a Routing Agent to the time at which an acknowledgment to the message is received. If a message has multiple destinations, then it is assumed that the acknowledgement will not be sent until all destinations have received the message. In this model, the Routing Agent has no knowledge of the destinations for the message and therefore must rely on the node that transferred the message to collect the individual acknowledgements and provide a single response to the Routing Agent.

Each Routing Agent maintains a recent history for measured message latencies through each node that it communicates. In a preferred embodiment of the invention, the size of the history that is used for the initial latency estimate for each node is tailored to a level appropriate for the deployed system.

For a specific instance of the model, l is defined to be the count of past message latency measurements to be used in the initial link cost estimation procedure. Define $A(0) \in$ ($\in$=included in) $R^{(2 \times 1)}$ that consists of l rows with two elements per row. Given initial measurement times $t_0, \ldots, t_l$ and initial message latency measurements $m_0, \ldots, m_l$, the matrix $A_{(0)}$ can be expressed as $$A_{(0)} = \begin{bmatrix} t_0 & 1 \\ t_1 & 1 \end{bmatrix}$$

Define a second matrix $b^{(0)} \in$ ($\in$=included in) $R^1$ consisting of the first l message latency measurements for communication through a specific node, e.g., $b^{(0)} = [m_0 \, m_1 \ldots m_l]$. The employment of a recursive least squares approach means that each new measurement of message latency for this node will update the model by using the new data to correct the model. Updates to the model are expressed as the combination of a two dimensional vector $a_{(k+1)} = [t_{k+1} \, 1]$ and a scalar $b^{(k+1)} = m_{k+1}$. To simplify the expression of the general model let $P_0 = (A_0^T A_0)^{-1}$, therefore $x^{(0)} = P_0 A_0^T b_{(0)}$. The equation for updating $P_{k+1}$ given $a_{(k+1)}$ a vector and $b(k+1)$ a scalar is $$P_{k+1} = P_k - \frac{P_k a_{(k+1)} a_{(k+1)}^T P_k}{1 + a_{(k+1)}^T P_k a_{(k+1)}}$$

Therefore, the formula for computing the recursive least-squares solution in this case is as follows, $$x^{(k+1)} = x^{(k)} + P_{k+1} a_{k+1} (b^{(k+1)} - a^T_{k+1} x_{(k)})$$

The two dimensional vector $x^{(k+1)}$ corresponds to the slope and y-intercept of a line through the last l message latency measurements where the x-axis corresponds to the time that the measurements were taken and the y-axis corresponds to message latency.

In a distributed scheduling environment there is the potential to experience race conditions where Routing Agents "race" to take advantage of under-utilized nodes. This occurs if communication from Routing Agents to nodes in the virtualized ESB is one directional, e.g., nodes have no mechanism to throttle Routing Agent communications. According to the invention described herein, nodes in the virtualized ESB are able to send choke packets to Routing Agents to control the rate of messages that are sent through the node. A choke packet is a special command message that originates in a node and is communicated to a Routing Agent. The choke message tells the Routing Agent that the node cannot currently accept traffic; the message also includes the time in the future when the node will be accepting traffic again.

The choke packet in effect reduces the processing time of a message on a node to the time required to send an acknowledgement of the message. The choke packet serves as a kind of negative acknowledgement to the Routing Agent that originated the message. Initial selection of the delay time included in the choke packet communication to the Routing Agent could be a constant amount of time. An extension would include the use of a variable delay time where the included delay time is derived from an estimate of the time required to process the messages pending processing on the node.

The Routing Agent upon receiving the choke packet must then incorporate this information into its link cost estimate calculation. This requires updating the message router's internal model of the link cost estimate for this node with the vector $$a_{(k+1)} = [t_{k+1} 1]$$

where $t_{k+1}$ is the current time and $b^{(k+1)}$ is equal to the delay expressed in the choke packet. This in effect increases the link cost estimate of this node tremendously due to the delay.

At a high level the distributed message routing protocol followed by the message routers in the system can be described at one level thusly. Upon receiving a message to route, the message router selects the node with the smallest link cost estimate at the current time.

Let the vector $x^i_{(k)}$ be the link cost estimation parameters of the i-th node in the virtualized ESB. Then given the current time, the Routing Agent calculates the link cost estimate for each node in the virtualized ESB that it is authorized to use. The message router selects the node with the minimum link cost estimate to process the outgoing message. If in response to the request for processing the Routing Agent receives a choke packet, it updates the link cost estimate for that node with the delay expressed in the choke packet and finds the new minimum link cost estimate node. In the unlikely event that the minimum link cost node remains unchanged after updating the link cost estimate with the delay information from the choke packet, then the message router will wait for the delay time to pass before repeating the procedure.

The link cost estimates are updated independently of the message routing procedure. Every latency update causes an update to the link cost estimate for the node as soon as it is processed. Therefore, link cost estimates for any given node may change during execution of the message routing procedure, e.g., link cost estimates should not be assumed static during the message routing procedure.

In the event that the message router does not receive an acknowledgement from the node chosen to process the outgoing message in a reasonable time frame, then the Routing Agent infers that the node is no longer available to process messages. The Routing Agent treats the lack of response from the node as a negative acknowledgement, recalculating the link cost estimate of the chosen node with a large incurred delay. The current model chooses a "reasonable" time for response as three times the standard deviation from the mean as calculated from the I most recent observations of message latency from the chosen node.

While the method of the invention has been illustrated and described with respect to a single node and the passage of a message to and through a single node, it is to be understood that the method of the invention may be used for a network or sequence of nodes in series.

The capabilities of the present invention can be implemented in hardware. Additionally, the invention or various implementations of it may be implemented in software. When implemented in software, at least one program storage device readable by a machine, tangibly embodying at least one program of instructions executable by the machine to perform the capabilities of the present invention can be provided by the program code.

The invention may be implemented, for example, by having the system and method for routing data packet traffic in packet networks and expediting the flow of the data packets and reducing the effects of congestion at nodes by least squares prediction of congestion and delay may be carried out in a dedicated processor or set of processors, or in a dedicated processor or dedicated processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for having the system and method for routing data packet traffic in packet networks and expediting the flow of the data packets and reducing the effects of congestion at nodes by least squares prediction of congestion and delay.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

We claim:

1. A computer-implemented method of routing data packet traffic in a packet network having a plurality of nodes, the method comprising:
   a hardware router capturing data for nodes on the packet network for initial measurement times, wherein the initial measurement times describe a time of day at which data packets pass through the nodes;
   a computer computing a least squares estimate of future delays of future data packets passing through the nodes as a recursive least-squares solution, wherein the recursive least-squares solution is computed using the initial measurement times, and wherein the least squares estimate of future delays provides an estimation of the future delays of the future data packets passing through the nodes;
   updating the least squares estimate of the future delays as each subsequent packet passes through a specific node on the packet network, wherein the updating utilizes a vector $a_{(k+1)}=[t_{k+1}1]$, wherein $t_{k+1}$ is a current time at which each packet passes through the specific node, and wherein the updating utilizes a scalar $b^{(k+1)}$, wherein scalar $b^{(k+1)}$ represents a delay of each packet passing through the specific node, wherein "k+1" is an identifier of an actual message latency "b", and wherein vector $a_{(k+1)}$ and scalar $b^{(k+1)}$ are updated to obtain a current, real time prediction of future delays of packets passing through the specific node; and
   the hardware router rerouting the future data packets through the packet network to avoid nodes that have computed predicted delays that exceed a pre-determined level.

2. The computer-implemented method of claim 1, further comprising computing the least squares estimate of current delays for current data packets passing through the nodes as another recursive least-squares solution.

3. The computer-implemented method of claim 1, further comprising:
   augmenting and updating, by the computer, the least squares estimate of future delays using choke packets from the nodes to generate updated delay estimates for future data packets passing through the nodes, wherein the choke packets describe actual delays of previous data packets as they passed through the nodes.

4. The computer-implemented method of claim 1, wherein a single data packet is addressed to multiple recipient nodes on the packet network, and wherein the computer-implemented method further comprises:
   preventing a transmission of the single data packet to a specific node on the packet network until all of the multiple recipient nodes have supplied a choke packet to a routing agent on the hardware router, wherein the choke packet describes actual delays of data packets passing through the multiple recipient nodes.

5. A packet network for transferring data packets from origin nodes to destination nodes via intermediate nodes, wherein the data packets are routed from node to node through the packet network using a path through the packet network, and wherein the packet network comprises:
   a hardware router for predicting a latency for a packet to pass through a specific node;
   a computer for augmenting a predicted latency for the packet to pass through the specific node, wherein the predicted latency is augmented using feedback communicated to a sender in the form of a choke packet from an overloaded node;

wherein the computer is suitably configured for computing an optimal path for routing data packets from node to node through the packet network, wherein the optimal path is computed by applying the predicted latency to the packet, and wherein the optimal path is predicted using a least squares algorithm; and wherein the computer is suitably configured for predicting a latency through another node for a subsequent packet by using the least squares algorithm, wherein predicting the latency through said another node for said subsequent packet comprises identifying past latency measurements as a function of time, extrapolating past latencies to predict a latency for a next packet, and updating the predicted latency based on a more recent latency, wherein identifying past latency measurements as a function of time, extrapolating past latencies to predict the latency for the next packet, and updating the predicted latency based on the more recent latency comprises:

keeping a record of past latencies of packets through a node;

maintaining the record of past latencies of packets in a column of a first matrix;

maintaining a record of durations of past latencies of packets in a column of a second matrix; and using a recursive least squares algorithm to predict a latency for a subsequent packet through the node.

6. A program product comprising a tangible computer readable storage media having computer readable code thereon for configuring and controlling a computer to route data packets through a network by a method comprising routing data packet traffic delay in packet networks having a plurality of nodes, wherein the computer readable code, when executed by the computer:

captures data for nodes for initial measurement times;

computes a least squares estimate of the data packet traffic delay for a packet as a recursive least-squares solution;

incorporates communicated delays into the least squares estimate to create an updated delay estimate, wherein the communicated delays are expressed as a choke packet that is sent from a node to the requester in response to the packet being rerouted to avoid congestion, and wherein the choke packet describes an actual delay of previous data packets passing through the nodes;

causes a first node in the network to communicate a negative acknowledgement of a transfer of a data packet, wherein the negative acknowledgement comprises information describing a delay period before a new transfer of the data packet is attempted, and wherein the information describing the delay period is incorporated into a recursive least squares procedure to generate a new latency prediction; and causes a router to re-route the data packet to a new node if the latency is no longer estimated to be the smallest available: else waiting the delay period before attempting to re-route the data packet through the first node.

7. The program product of claim 6, further comprising computer readable code for computing the least squares estimate of a future delay for a future data packet as a recursive least-squares solution.

8. The program product of claim 6 further comprising computer readable code for updating the least squares estimate of the delay for each data packet passing through a specific node on the packet network.

* * * * *